March 25, 1941.  M. R. HUTCHISON, JR  2,236,139
POWER TRANSMISSION DEVICE
Filed Dec. 17, 1938  2 Sheets-Sheet 1

INVENTOR
MILLER R. HUTCHISON, JR.
BY
his ATTORNEY

March 25, 1941. M. R. HUTCHISON, JR 2,236,139
POWER TRANSMISSION DEVICE
Filed Dec. 17, 1938 2 Sheets-Sheet 2

INVENTOR
MILLER R. HUTCHISON, JR.
BY
his ATTORNEY

Patented Mar. 25, 1941

2,236,139

UNITED STATES PATENT OFFICE 2,236,139

POWER TRANSMISSION DEVICE

Miller R. Hutchison, Jr., Rochester, N. Y., assignor to Paul Kollsman, New York, N. Y.

Application December 17, 1938, Serial No. 246,389

4 Claims. (Cl. 64—19)

This invention relates to power transmission devices, more particularly to devices for transmitting power from a first rotating to a second rotatable element.

More particularly, it is an object of this invention to provide a device for transmitting power from a combustion engine to a driven member, for example an aircraft propeller, having a relatively great moment of inertia.

The usual construction followed in attaching an aircraft propeller or some other driven member possessing a relatively great moment of inertia to an internal combustion engine is to mount the said propeller or member fixedly on the engine shaft or an extension thereof. Thus, the driven member and the crankshaft become a unitary system in which the great moment of inertia of the driven element largely determines the oscillatory properties of the system.

The moment of inertia in combination with the elasticity of the crankshaft of the engine determines the natural vibrational frequency of the rotating system and its response to the impressed cyclic variations of the engine torque. A natural frequency falling within the operating range of the engine gives rise to highly objectionable torsional vibrations, if the engine rotates at a speed at which the cyclic variations of the engine torque occur at such natural frequency.

Taking, as a specific example, a certain radial 9-cylinder engine, it is found that the principal fluctuations in applied torque occur at a rate of 4½ times per revolution and amount to approximately plus or minus 50% of the mean output torque of the engine at rated speed and load. If the speed of the engine is increased a matter of ten to fifteen per cent above normal, synchronous torsional vibrations set up in the rotating system increase the working stresses in the crankshaft an estimated five to ten times those necessary to transmit the mean brake torque corresponding to the increased speed and propeller load.

It is, accordingly, an object of this invention to divorce a driven member possessing a relatively great moment of inertia, such as a propeller, from the shaft of a source of power producing a fluctuating torque and to permit angular displacements to occur between the driven element and the shaft. In this manner, the natural period of vibration of the system usually may be raised sufficiently to lie beyond the speed range in which the engine is to be used.

According to the invention, a first and a second rotatable member such as, for example, a crankshaft and a propeller are mounted for coaxial rotation and for angular displacement relatively to each other. Power is transmitted from the driving to the driven member by means of one or a plurality of toggle joints connected between the said first and said second member.

It is a further object of this invention to damp the residual vibrations which occur in a driving shaft subject to fluctuations in torque by providing damping means between the driving and the driven member.

Further aims, objects and advantages of this invention will appear from a consideration of the description which follows with accompanying drawings showing, for purely illustrative purposes, embodiments of this invention. It is to be understood, however, that the description is not to be taken in a limiting sense, the scope of the invention being defined in the appended claims.

Referring to the drawings.

Figure 1:
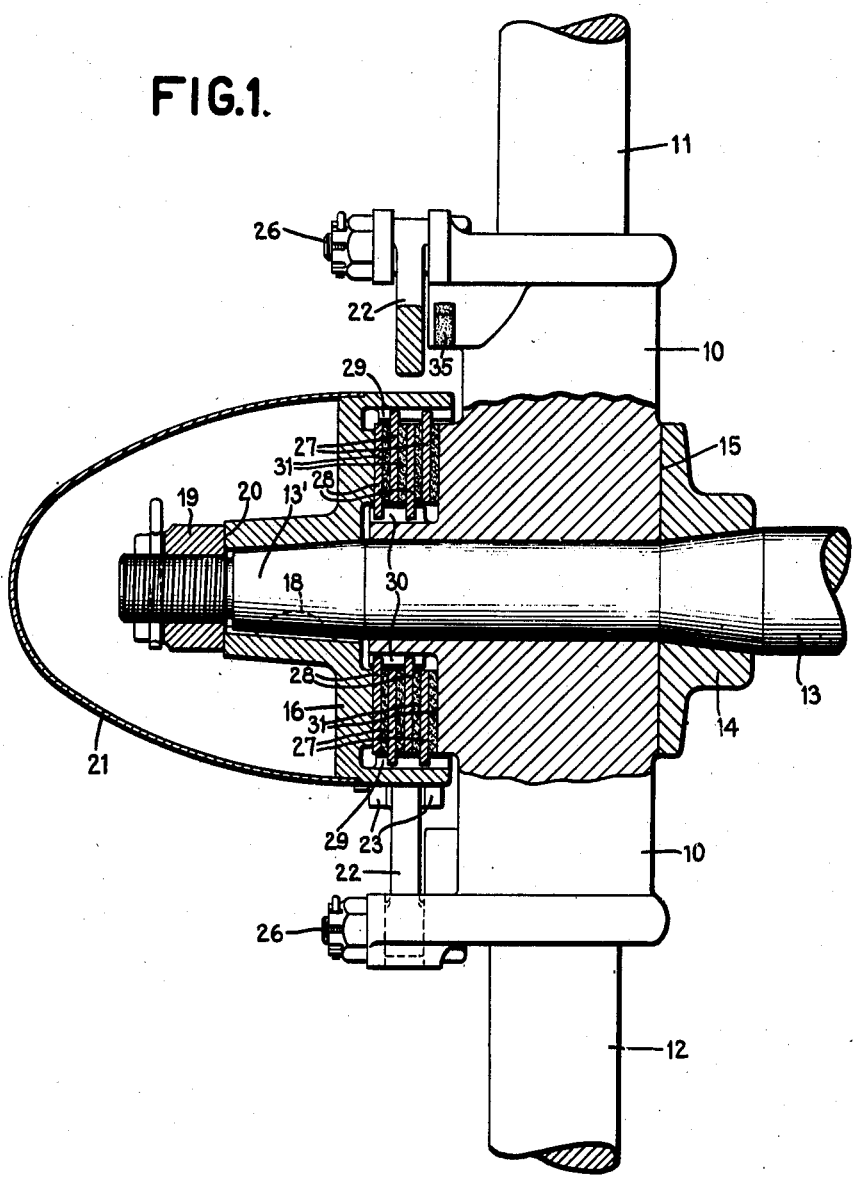
Fig. 1 is a side elevation partly in section of an embodiment of this invention.

In the drawings, the present invention is illustrated as applied to a device for transmitting power from the crankshaft of an internal combustion engine to a tractor propeller.

A hub 10 carrying propeller blades 11 and 12 is rotatably mounted on a shaft 13 which may be the crankshaft of an engine or an extension thereof. The crankshaft may be provided with a flange 14 against which the hub bears with a rear face 15. A lever member shown in the illustrated embodiment as having the form of a drum 16 provided with arms 17 is fixedly mounted on the shaft as, for example, by means of a spline 18 and a nut 19 seated endwise against a face 20 of the lever member and forcing the member onto a conical extension 13' of the crankshaft. A stream-lined cap 21 may be provided to enclose the front end of the shaft 13.

The lever member together with the crankshaft thus constitutes a driving member relatively to which the driven member, the hub 10, may become angularly displaced.

For transmitting driving power from the first to the second member, one or a plurality of toggle joints may be provided. In the illustrated embodiment, two toggle joints are shown each comprising a pair of links 22 and 23 joined at a pivotal axis 24 and pivotally connected with their free ends to said first and second member at 25 and 26 respectively.

The operation of the device so far described is as follows:

When the engine is started with an inertia starter, the propeller hub 10 will lag behind the engine shaft thereby straightening out the links into an aligned position. As soon as the engine acquires rotative speed, centrifugal force will act on the toggle joint tending to move the toggle joint towards a closed position.

Figure 2:
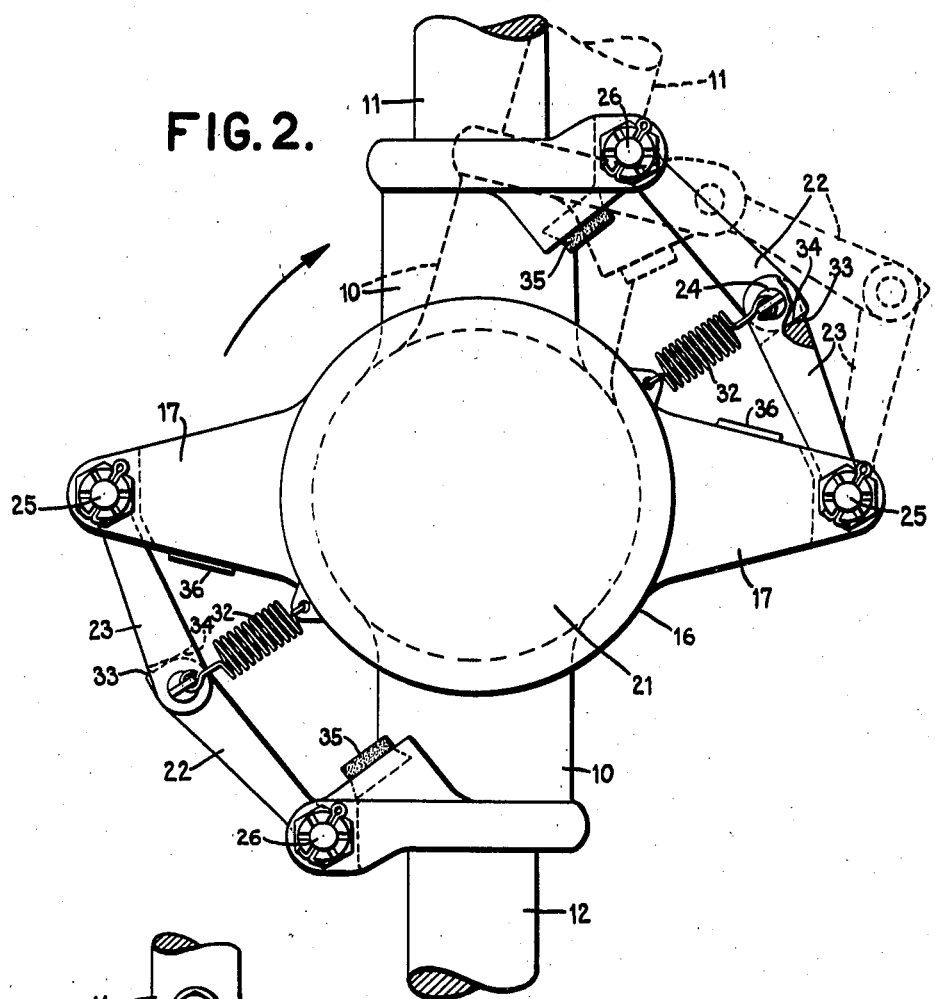
Fig. 2 is a front view of the device shown in Fig. 1.

The design of the toggle joint is preferably such that the centrifugal force acting upon it at normal running speed will fold the joint to a mean position about one-half way closed as indicated in dotted lines in Fig. 2, in opposition to the action of the mean torque output of the engine.

If the running speed is changed, as for example, by opening the engine throttle or closing the same, the mean torque necessary to operate the propeller will change in approximately the same degree as the centrifugal force acting upon the toggle joints. Accordingly, no change will take place in the mean position of the links.

In response to the cyclically changing torque, however, the crankshaft will gain and lose speed relatively to the propeller hub, thus causing the toggle joint cyclically to open and close somewhat with respect to the mean position.

Inasmuch as the propeller hub is not rigidly connected to the engine shaft, the great moment of inertia of the propeller will not appreciably influence the natural frequency of the crankshaft. The crankshaft thus constitutes a rotating system of its own, divorced from the propeller, and possessing a natural frequency which is safely above the normal, as well as emergency, rates of speed of the engine.

It may be desirable to damp the relatively angular displacements between the shaft and the hub. For this purpose, damping means may be provided between the driving and the driven members, or at the toggle joints.

In the illustrated embodiment, a damping means of the frictional type is shown comprising a plurality of discs 27 and 28 engaging with splines 29 and 30 in the drum 16 and the hub 10 respectively. Between the metallic discs, friction discs 31 may be provided.

If the propeller load increases, the propeller hub tends to become axially displaced towards the drum 16 thereby compressing the set of discs 26, 27 and 28, thus making the damping approximately proportional to the load carried by the engine.

Biasing means may be provided moving the toggle joint into a predetermined position when the load applied to the propeller is small, zero or negative. In the illustrated embodiment, a helical spring 32 is shown connected to the joint of the toggle and the drum 16. When the engine is at rest or idles without any appreciable load on the propeller, the links of the toggle are moved into an aligned position establishing a substantially rigid connection between the crankshaft and the engine, thus stabilizing the engine at idling speeds in the manner of a flywheel. The links may be provided with a stop limiting the movement of the links beyond the extended position. In the illustrated embodiment, the link 22 is provided with an extension 33 bearing against a surface 34 of the link 23.

Upon an increase in rotative speed, however, the centrifugal force acting on the toggle will move the links towards the closed position.

If the load on the propeller is greatly increased, for example, by varying the pitch of the propeller, the toggle links are moved towards a stretched position. The extreme position in which a rigid connection is established is never obtained as long as a substantial centrifugal force acts on the toggle joint. This is due to the fact that the force exerted by the free ends of a toggle joint increases towards the infinite when the links of the toggle approach an aligned position.

Due to this fact, a yielding drive is always maintained between the driving and the driven members irrespective of the magnitude of the load imposed on the driven member.

For the purpose of preventing damage, if the rotatable members are moved into an extreme position in which the toggle levers are closed, for example as might occur should the engine backfire when starting, a resilient buffer 35 may be provided mounted on one of the rotating members and bearing against a surface 36 on the other member in such an event.

Figure 3:
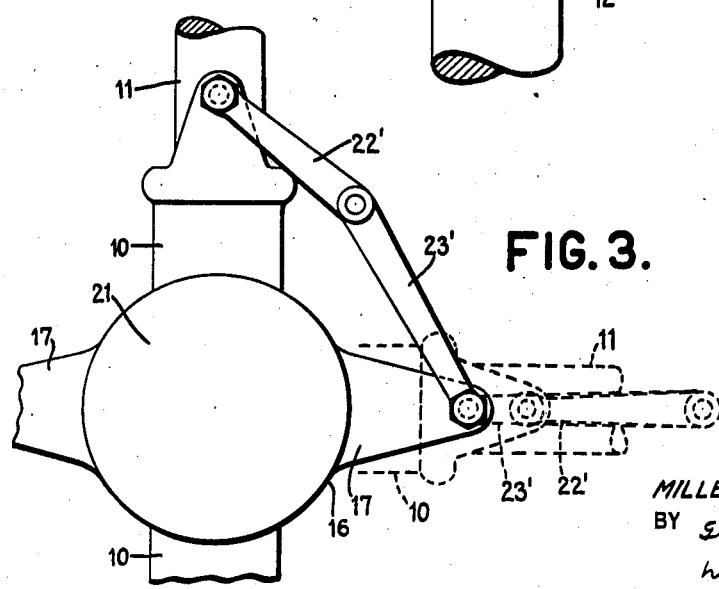
Fig. 3 is a front view of a modified form of the invention.

A modified form of the invention is shown in Fig. 3 in which the toggle links 22' and 23' are of unequal length permitting a movement beyond the position in which the links are folded as shown in dotted lines. This modified form of the invention is adapted for driving a rotatable member from a reversible engine in opposite directions.

Obviously, the present invention is not restricted to the particular embodiments or application herein shown and described. Moreover, it is not indispensable that all of the features of this invention be used conjointly, since they may advantageously be employed in various combinations and sub-combinations.

What is claimed is:

1. The combination of a first member rotatable about an axis; a second member mounted for rotation about said axis and for angular displacement relatively to said first member; and a pair of jointed links forming a toggle, said links being pivotally connected with their free ends to said first and second member, respectively, at pivotal axes spaced from and parallel with said first axis; and damping means responsive to the axial thrust exerted by one of said members for exerting a damping torque between said members conditioned upon the magnitude of said axial thrust.

2. The combination of a first member rotatable about an axis; a second member mounted for rotation about said axis and for angular displacement relatively to said first member; and a pair of jointed links forming a toggle, said links being pivotally connected with their free ends to said first and second member, respectively, at pivotal axes spaced from and parallel with said first axis; and a damping means including frictionally inter-engaging discs connected to said first and said second member, respectively, said discs being axially loaded in response to the magnitude of the axial thrust exerted by one of said members.

3. The combination of a driving shaft of an engine; a propeller having blades mounted on said shaft with freedom of angular movement of the blades relatively to the shaft in a plane normal to the axis of rotation of the shaft; a toggle joint connected to said shaft and said propeller, respectively, for adjusting the angular position of said blades in said plane relatively to said shaft and transmitting torque from said shaft to said propeller, said toggle joint being adapted to be acted upon by centrifugal force caused by rotation of said shaft; and a frictional brake connected between said shaft and said propeller resisting an angular change in position between said shaft and said propeller.

4. The combination of a driving shaft of an engine; a propeller hub mounted on said shaft for rotation relatively to said shaft; a propeller blade mounted on said hub in fixed positional relation to said hub in a plane normal to the axis of rotation of the shaft; a toggle joint adapted to be acted upon by centrifugal force caused by rotation of said shaft, said joint being connected to said shaft and said hub, respectively, for transmitting torque from said shaft to said propeller; and a frictional brake connected between said shaft and said hub resisting an angular change in position between said shaft and said hub.

MILLER R. HUTCHISON, Jr.